United States Patent
Powers et al.

[15] 3,660,841
[45] May 2, 1972

[54] APPARATUS AND METHOD FOR ADJUSTING THE INDEXING RATE OF A FIXED LENGTH SHIFT REGISTER

[72] Inventors: Allen E. Powers, Canoga Park; Robert Segal, Pacific Palisades, both of Calif.

[73] Assignee: Litton Systems, Inc., Beverly Hills, Calif.

[22] Filed: Sept. 8, 1969

[21] Appl. No.: 856,120

[52] U.S. Cl. ..........................343/5 DP, 340/3 R, 343/17.1 R
[51] Int. Cl. ..........................................................G01s 9/02
[58] Field of Search ..........................340/3; 343/5 DP, 17.1

[56] References Cited

UNITED STATES PATENTS

| | | |
|---|---|---|
| 3,167,738 | 1/1965 | Westerfield............................343/5 DP |
| 3,277,473 | 10/1966 | Calhoon, Sr. et al. ...............343/5 DP |
| 3,505,637 | 4/1970 | Albruzzo............................343/17.1 X |
| 3,532,867 | 10/1970 | Ricketts, Jr. et al. ............343/5 DP X |
| 3,315,258 | 4/1967 | Dillard..................................343/5 DP |

Primary Examiner—Malcolm F. Hubler
Attorney—John G. Mesaros, Alan C. Rose, Ronald W. Reagin and Alfred B. Levine

[57] ABSTRACT

A means and method for adjusting the indexing rate of a fixed length shift register to cause the register to index through its entire length during one period between variably spaced trigger pulses, the shift register being clocked at different clocking rates.

18 Claims, 6 Drawing Figures

INVENTORS
ROBERT ELLIOT SEGAL
ALLEN EDWARD POWERS
BY John G. Mesaros

ATTORNEY

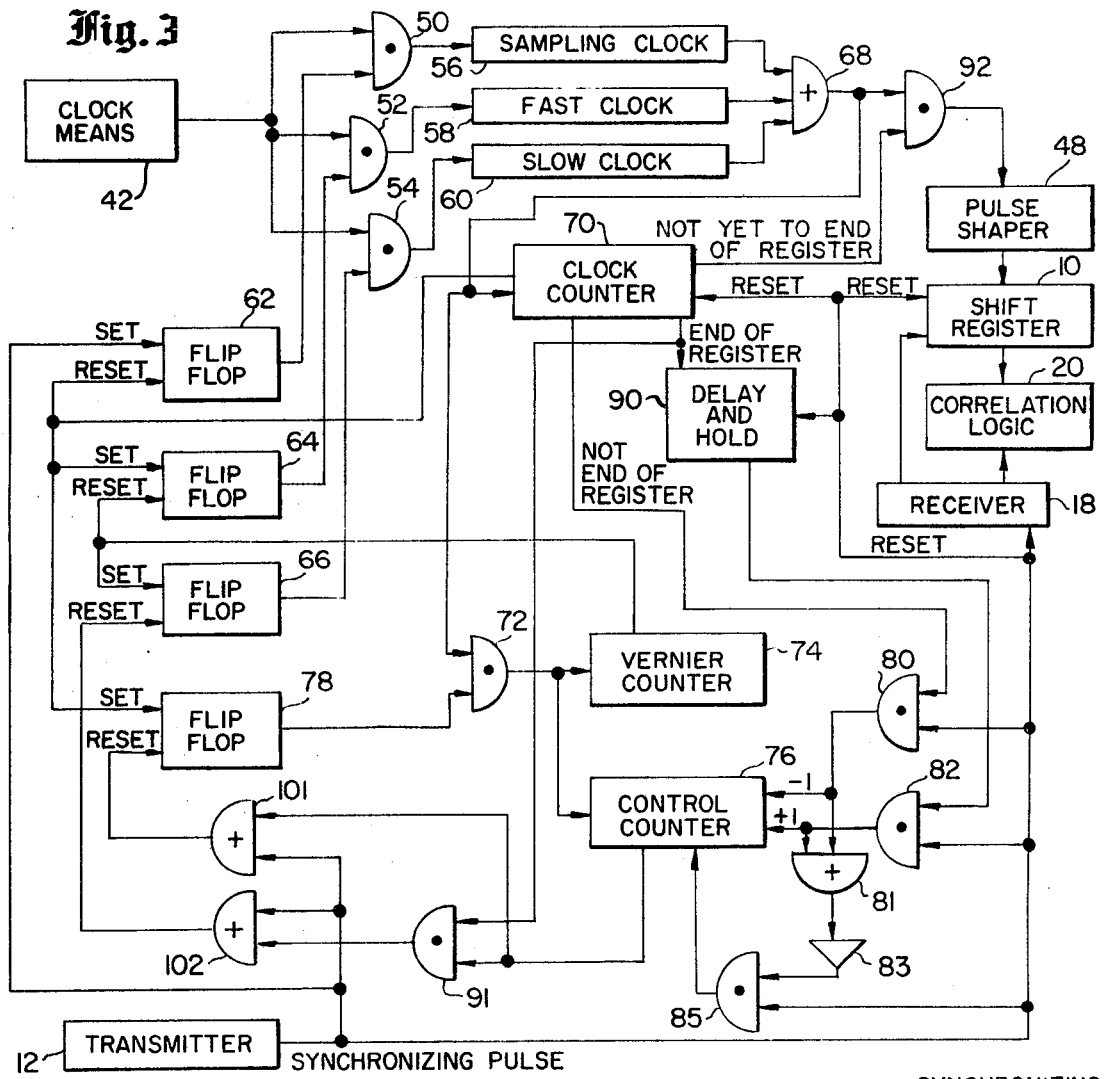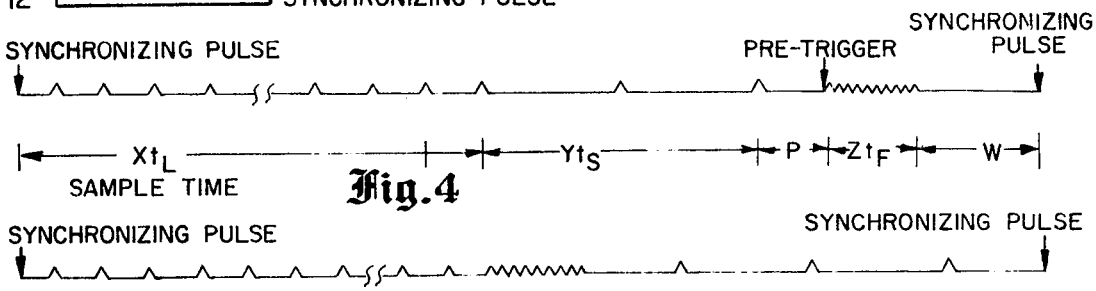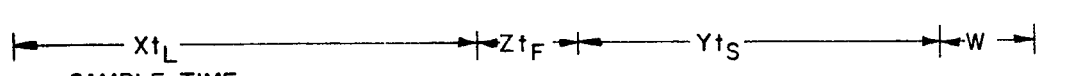

APPARATUS AND METHOD FOR ADJUSTING THE INDEXING RATE OF A FIXED LENGTH SHIFT REGISTER

BACKGROUND OF THE INVENTION

This invention pertains to a means and method for synchronizing a fixed length dynamic shift register to cause it to shift through its entire length in the period between synchronizing pulses in, for example, a radar, IFF system or sonar system.

A typical radar, IFF or sonar system transmits a pulse of energy outward toward a target. A synchronizing pulse is delivered to a timing circuit in synchronism with the outgoing pulse. An echo or reply is received from the target, and the time between the synchronizing pulse and the returned echo is a measure of the range between the radar antenna or sonar transducer and the target.

Frequently the received signals, caused by consecutively transmitted pulses, may be added to each other or compared. For example, the consecutive signals may be added together to increase the signal to noise ratio. The signals may be compared to a reference to indicate the identity of the target. The returned signals for consecutive pulses may be compared to determine if they have the proper characteristic or signature indicating that the returned pulse is indeed caused by the reflection of the transmitted pulse and is not a retransmission of a pulse which originates at another transmitter.

When received information is being fed into the leading bit position of the storage register, the register is clocked at a predetermined sampling rate which depends upon the rate of receipt of information to be stored. After a predetermined length of time no more information to be stored is expected, and the sampling is terminated. There is then a waiting period before the reception of the next synchronizing pulse or trigger. In order for the stored information, in consecutive intervals between synchronizing pulses, to be compared, the leading bit of the register should be in position to receive new information when the next synchronizing pulse is received.

Dynamic shift registers using metal-oxide-silicon field-effect-transistors (MOS FET) have significant advantages over other shift register devices in size, power dissipation, packaging flexibility, and cost. They have, however, hitherto not been used to store radar or sonar data because of the difficulty in synchronizing the fixed length registers to the period between synchronizing pulses which vary from system to system and from interrogation to interrogation. To be useful in a radar or sonar system, data needs to be stored in the shift register in a time sequence and spacing relative to a synchronizing pulse or trigger, and then it needs to be read out with the same time sequence and spacing after a succeeding synchronizing pulse or trigger.

A typical one-bit delay circuit for use as an element of a dynamic shift register, using MOS FET devices is shown in "The Electronic Engineer", September 1968, pg. 47, column 2. Each one bit delay circuit is adapted to store information for only a short period of time without revitalization of the stored information. The maximum storage time depends upon the resistance-capacitance constants of the MOS FET circuit. Thus, the register needs to be clocked faster than a minimum clocking rate. There is also an upper limit upon the speed with which the MOS FET circuits may be clocked. That upper limit is also determined by the resistance-capacitance constants of the MOS FET one-bit delay circuit. It should be apparent that one need not use a slow clock which is as slow as the MOS FET circuits will tolerate. Further, one need not use a fast clock which is as fast as the MOS FET circuits will tolerate.

SUMMARY OF THE INVENTION

This invention pertains to a means and method for causing a fixed length dynamic shift register to shift through its entire length in a period between a pair of variably spaced synchronizing pulses. A predetermined number of shifts of the shift register are indexed at a clock rate called a sampling rate during which information is stored into the shift register. At the end of the predetermined number of shifts, a waiting period occurs for the next synchronizing pulse. During that waiting period, the remaining bits or shifts of the shift register are cycled. To cycle the remaining bits of the shift register, a combination of very slow clock pulses and very fast clock pulses are used to clock the shift register. Typically the time between pulses of the slow pulse train is on the order of 100 times the time between pulses of the fast pulse train. The slow clock pulses must not be so slow that the information in the dynamic shift register is lost. The fast clock pulses must not be so fast that the dynamic shift register does not accurately shift the stored information from one bit position to the next consecutive bit position.

In one embodiment of the invention, after the sampling period, the register is first clocked at the slow clock rate until a decisive event occurs, at which time the fast clock causes the register to complete its travel through its entire length before the next synchronizing pulse is received. Slow pulses are applied until a pre-trigger pulse is received from the transmitter signifying that the synchronizing pulse will be received within a predetermined period of time. When the pre-trigger pulse is received, fast pulses are applied to complete the shifting of the shift register.

In a second or adaptive embodiment, after the sampling period, fast pulses followed by slow pulses are applied until the end of the register or the next synchronizing pulse is received, whichever occurs first. An adaptive circuit adjusts the mix of fast and slow pulses to increase the number of fast and decrease the —number of slow pulses if the synchronizing pulse is received before the end of the register is reached. If the end of the register is reached significantly before the next synchronizing pulse is received, the adaptive circuit adjusts the mix of fast and slow pulses to decrease the number of fast and increase the number of slow pulses. When the adaptive circuit is properly adjusted, the waiting between the reaching of the end of the shift register and the arrival of the synchronizing pulse does not exceed the maximum time that the dynamic shift register is capable of storing information. If the end of the register and the synchronizing pulse arrive sufficiently close to each other, no additional adjustment is made and the circuit is ready to receive and store usable information.

In the second or adaptive embodiment, two auxiliary counters, called a control counter and a vernier counter, are used. The vernier counter is typically a ring counter which has a capability of counting pulses equal in number to the pulses remaining, at the end of the sampling period, to be shifted in the shift register. The control counter has the ability to count the same number of pulses as the vernier counter but, in addition, has associated logic circuits that count the control counter up one extra bit or down one extra bit depending upon whether the end of the register is reached before the arrival of the synchronizing pulse or the synchronizing pulse is received before the end of the register is reached. If the end of the register and the receipt of the synchronizing pulse are sufficiently close to each other, no correction is made in the control counter count, and it counts the same number of bits as the vernier counter. The vernier counter may start at any position, the starting positive relative to its position "0" controlling the mix of fast and slow pulses delivered to the register. The end of the sampling starts the fast clock pulses and starts pulses channeling to the control and vernier counters. When the vernier counter reaches its designated "0" position, the fast pulses are stopped and the slow pulses are started. When the control counter reaches its designated "0" position, the flow of pulses to the control and vernier counters is stopped. The delivery of an extra count up or count down pulse to the control counter causes the starting position on the vernier counter to be moved from one position to another, causing a new mix of fast and slow pulses to be delivered between the end of the next sampling period and the receipt of a following synchronizing pulse.

It is therefore an object of this invention to synchronize a fixed length dynamic register to a period between synchronizing pulses.

It is a more specific object of this invention to synchronize a fixed length dynamic shift register to shift through its entire length in a variable period between a pair of synchronizing pulses.

It is still a more specific object of this invention to cause a dynamic shift register to start cycling upon receipt of a synchronizing pulse, to shift at a sampling rate during the storing of information into the shift register, then to shift at varying controlled rates to cause the register to complete an entire transition from one end to the other and to arrive at its end within a predetermined period of time of the receipt of the next synchronizing pulse.

It is a specific object of this invention to provide apparatus and method for achieving the above-enumerated objects.

BRIEF DESCRIPTION OF DRAWINGS

Other objects will become apparent from the following description, taken in connection with the accompanying drawings in which.

FIG. 3 is a block diagram of a second embodiment of this invention;

FIG. 4 is a timing diagram showing the clocking of the shift register in the embodiment of FIG. 2;

FIG. 5 is a timing diagram showing typical clocking of the embodiment of FIG. 3 after the clocking is adjusted.

DESCRIPTION OF THE PREFERRED EMBODIMENTS

Figure 1:
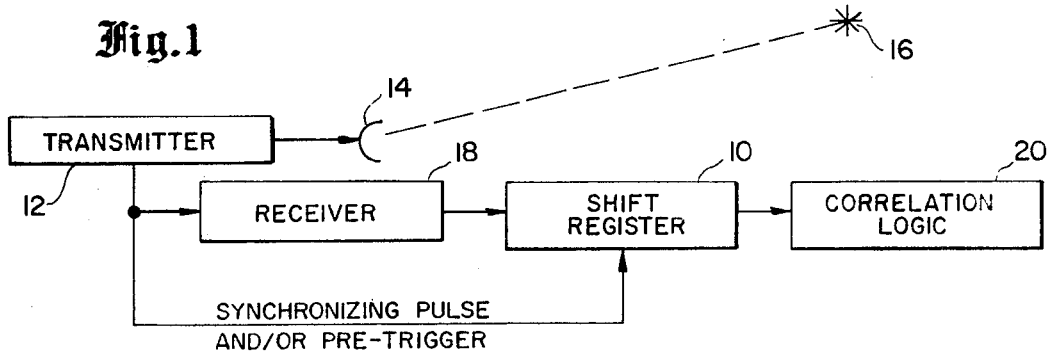
FIG. 1 is a block diagram of a radar or sonar transmitter and receiver combination using the shift register in accordance with this invention.

FIG. 1 is a block diagram showing a typical connection of a shift register 10 in a radar system. The transmitter 12 directs a pulse of microwave energy through an antenna 14 to a target 16 from which echos are received at the antenna 14 and delivered to the receiver 18. The transmitter 12, substantially simultaneously with the emission of a pulse of microwave energy, delivers a synchronizing pulse to the receiver 18 and to the shift register 10. The synchronizing pulse causes the receiver 18 to become sensitive to the reception of the echo returned from the target 16. The synchronizing pulse also sets the shift register 10 into its zero bit position. The shift register then begins to index at clock rate such that the position of the stored signals in the shift register 10 is a measure of the range from the antenna 14 to the target 16. The shift register 10 is adapted, as described hereinafter, to index through a predetermined number of bit positions and to return to its initial position by the time the next synchronizing pulse is received from the transmitter 12. As the shift register 10 shifts through its various positions, each bit or cell of the shift register 10 arrives at the end of the shift register and generates a signal (or no signal) in accordance with the information stored in the last bit position of the shift register. The signal at the output of the shift register 10 is delivered to a correlation network 20 which compares the position of the information in the shift register 10 for successive radar pulses.

Instead of a radar transmitter, it may readily be seen that the transmitter 12 could, for example, be a sonar device with the element 14 a sonar transducer in contact with the water.

The shift register 10 may be a dynamic shift register, such as a register using metal-oxide-silicon field-effect-transistors. Such a register is shown in "The Electronic Engineer", September 1968 issue, on pg. 47, in column 2. Each cell of the shift register is adapted to store information for a relatively short period of time without revitalization. The maximum length of storage of each cell depends upon the resistance-capacitance constants of the MOS FET circuits Thus, the shift register 10 would need to be clocked faster than a minimum clocking rate. The slowest clocking rate or "slow clock" used in this invention is preferably only slightly faster than the minimum allowable rate. There is also an upper limit on the speed, determined by the resistance-capacitance constants of the circuits, with which MOS FET circuits may be clocked. The "fast clock" rate used in this invention preferably approaches the maximum allowable rate. When actually receiving information, the rate of clocking of the shift register, called the "sampling rate", is somewhere between the slow and fast clock rates.

To simplify the explanation of the invention it is convenient, in the interest of clarity, to use a specific example. In the chosen example it is desired to specify that 1,000 of the 1,100 shifts of the register 10 between pulses of the transmitter 12 should occur during the time when a return echo is expected from the receiver. The remaining 100 shifts of the register 10 are clocked at the slow or fast clock rate, or mixtures of the two rates, to cause the leading bit of the 1,100 bits in the shift register to appear at the input of the shift register 10 in synchronism with the next synchronizing pulse.

Figure 2:
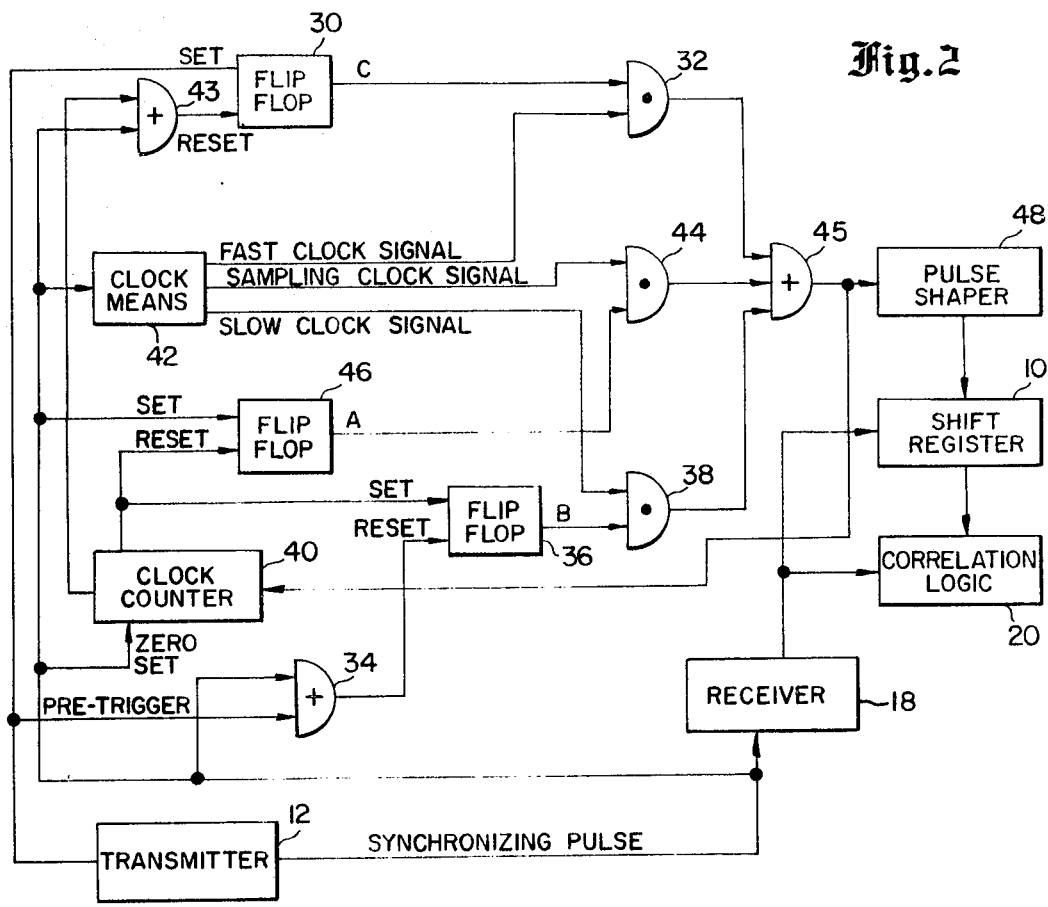
FIG. 2 is a block diagram of a first embodiment of this invention.

A first embodiment of a circuit of this invention to cause the shift register 10 to cycle or shift through a predetermined number of cells or one-bit delay circuits in the period between variably spaced synchronizing pulses is shown in FIG. 2. In the embodiment of FIG. 2, the transmitter not only produces a synchronizing pulse, but also a pre-trigger pulse which is connected to set the flip-flop 30 which is connected to open AND gate 32. The pre-trigger pulse from transmitter 12 is also connected, through OR gate 34 to reset flip-flop 36, thus closing the AND gate 38. The synchronizing pulse from the transmitter 12 is connected to OR gate 34 to reset flip-flop 36. The synchronizing pulse is likewise connected to zero-set the clock counter 40. Similarly, the synchronizing pulse synchronizes the signal of the clock means 42, and it is connected through the OR gate 43 to reset the flip-flop 30.

The clock means 42 generates clock signals of differing frequencies which are labeled "fast clock signal", "sampling clock signal", and "slow clock signal". The fast clock signal is connected to the input of AND gate 32 which is opened by signals from flip-flop 30. The sampling clock signal is connected to the input of AND gate 44 which is controlled by the output of flip-flop 46. Flip-flop 46 is connected to be set by the synchronizing pulse from transmitter 12. The slow clock signal is connected to the input of AND gate 38 which is controlled by flip-flop 36. The outputs of gates 32, 44, and 38 are connected to the input of OR gate 45.

It is apparent that, instead of producing three clock rates, the clock means 42 could produce a fast clock rate, and the sampling and slow clock rates could be produced by clock rate dividers as in the embodiment of FIG. 3.

The output of OR gate 45 is connected to the input of a pulse shaper 48. The clock pulses to be countered are connected to the clock counter 40.

The pulse shaper 48 converts the clock pulses to narrow, typically negative going pulses that are compatible with the levels and phasing required by the circuitry of the individual cells of the register 10.

The sequence is started with the receipt from the transmitter 12 of a synchronizing pulse which is synchronized with the pulse transmitted by the antenna 14. The synchronizing pulse sets the clock counter to zero, starts the clock pulses from the clock means 42, ensures that the flip-flop 30 has been reset to close gate 32 and to inhibit fast clock signals, sensitizes the receiver 18 to receive return echos from the target 16, and sets flip-flop 46 to open gate 44 and to channel sampling clock signals to the OR gate 45. The sampling clock signals from the gate 45 are shaped by the pulse shaper 48 to index the shift register 10 in synchronism with the sampling clock signal.

In the example, 1,000 pulses of the sampling signal are channeled through the shaper 48 to the register 10. During the period of channeling the sampling clock signals, signals are received by the receiver 18 from targets. The received signals are each stored, as received, in the leading bit position of the shift register 10. Thus, various cells of the shift register 10 have signals stored therein indicative of the ranges or the identity of targets. It is evident that azimuth information also could be stored in the register 10. The signal from the receiver 18 is also channeled to the correlation logic circuit 20 which may, for example, match the incoming signal with the output of the shift register. The output signal of the shift register is indicative of whether a signal had been stored at a particular position in the shift register during the period between synchronizing pulses immediately preceding the present period. If the signals stored during the last preceding interval between synchronizing pulses match the signals now received, the correlation logic circuit 20 then produces a signal. If the correlation logic circuit 20 senses a mismatch between the signal received by receiver 18 and the output of the shift register 10, no signal is produced. Spurious signals are thereby inhibited. A correlation logic circuit, in its simplest form, might be merely an AND gate.

In the example, after 1,000 pulses have been transmitted from the gate 45 to the clock counter 40, the counter 40 generates a signal which resets flip-flop 46 and sets flip-flop 36, opening gate 38 to allow the slow clock signals to be channeled through the OR gate 45 to the pulse shaper 48, thence to the shift register 10. The waiting period for the next synchronizing pulse now begins.

The circuit of FIG. 2 then ensures that exactly 100 clock signal pulses are delivered through the pulse shaper 48 to the register 10 to cause the register 10 to be in its position wherein the leading bit of the shift register is ready to receive pulses from the receiver immediately after the next synchronizing pulse. To demonstrate the action of the circuit of FIG. 2, it is desirable to consider several situations.

The first possibility is that 100 slow clock signals will be delivered to the shift register 10. When this occurs, the clock counter 40, at the end of the 100 signals, delivers a steady signal through OR gate 43 to the reset terminal of the flip-flop 30, thereby inhibiting the setting of the flip-flop 30 when the pre-trigger pulse is received. The timing is such that the pre-trigger pulse arrives before an additional slow clock signal may be delivered. The arrival of the pre-trigger pulse at gate 34 resets flip-flop 36 inhibiting the slow clock signals at gate 38. The arrival of the synchronizing pulse restarts the next cycle.

A second situation occurs when the pre-trigger pulse is generated before 100 slow clock signals have been delivered to the register 10. The pre-trigger pulse sets the flip-flop 30 allowing fast clock signals to be channeled through gates 32 and 45 to pulse shaper 48 and to shift register 10 causing shift register 10 rapidly to advance to its zero position. When register 10 reaches its zero position the clock counter 40, through gate 43, resets the flip-flop 30 which inhibits the delivery of fast clock pulses to register 10. The receipt of the next synchronizing pulse restarts the cycle.

Thus, the longest waiting period realizable between the end of receipt of sampling clock signals by the shift register 10 and the receipt of the next synchronizing pulse from the transmitter 12 is the time duration of 100 slow clock signals, plus the longest storage time of a one-bit delay circuit in the shift register 10. The shortest waiting period, equal to the time duration of 100 fast clock signals, occurs if the pre-trigger pulse is received immediately after the setting of flip-flop 46.

The timing of the circuit of FIG. 2 is shown in FIG. 4. If "$X$" is the number of sample pulses (in the example, 1,000), and $t_L$ is the time or period between sampling pulses, the total time for the sample is $Xt_L$. If "$Y$" is the number of slow pulses and $t_S$ is the time spacing or period between slow pulses, the total time used by the slow pulses is $Yt_S$. The interval "$P$" is the time of the interval between the last slow pulse and the start of the fast pulses. If the symbol "$Z$" is the number of fast pulses, and $t_F$ is the time spacing or period between the fast pulses, $Zt_F$ is the total time used by the fast pulses. "$W$" is the waiting period between the time of reaching the end of the register (in the example, 1,100 pulses), and the receipt of the next synchronizing pulse. The total time between synchronizing pulses is equal to the sum $Xt_L+Yt_S+P+Zt_F+W$.

In the adaptive embodiment of FIG. 3, no pre-trigger pulse is needed to stop the slow clock signal and to start the fast clock signal. After several periods between synchronizing pulses, the circuit of FIG. 3 adapts its timing to cause the number of pulses delivered between synchronizing pulses to the shift register 10 (in the example) to equal 1,100 pulses.

The signal from the master clock means 42 is connected through AND gates 50, 52, and 54 to pulse rate dividers 56, 58, and 60 which divide the rate of the clock pulses to produce pulses at the sampling, the fast, and the slow clock rates. It is apparent that the clock means 42 could produce signals at each of the rates (as in FIG. 2). The gates 50, 52, and 54 are opened in response to the output signals of flip flops 62, 64, and 66. The outputs of clock rate dividers 56, 58, and 60 are connected through the OR gate 68 to the AND gate 92, thence to the shaper 48 and to the shift register 10. The output of gate 68 is also connected to the clock counter 70 and, through the AND gate 72, to the vernier counter 74 and the control counter 76. The AND gate 72 is connected to be controlled by the output signal of flip-flop 78. The vernier counter 74 and the control counter 76 are connected to control the mix of slow and fast clock signals delivered to the register 10. The counters 74 and 76, then, are adapted to adjust to cause the mix of slow and fast signals to cycle the register 10 so that it arrives at its end just before the synchronizing pulse arrives from the transmitter 12.

The vernier counter 74, in the given example, is a ring counter which counts 100 pulses. The control counter 76 is a counter which counts 99, 100, or 101 pulses depending upon the states of AND gates 80, 85, and 82. Gate 85 is open only when both gates 80 and 82 are closed, as indicated by the connections of the OR gate 81 and the inverting amplifier 83. The elements 81 and 83, or their logical equivalent, can be wired internally of the counter 76. The gate 80 is connected into its open position by a signal from clock counter 70 signifying that the register 10 has not yet reached its end or 1100 position. The gate 82 is opened by signals from counter 70, delayed by delay and hold circuit 90, indicating that the end of the register 10 has been reached and the maximum storage time of the register 10 has been exceeded.

The counter 76 is initially enabled by the synchronizing pulse through gate 85 to be reset to its 99 position by the next fast pulse channeled through gate 72. The counter 76 then counts down to zero.

If the gate 80 is open when the next synchronizing pulse arrives, the synchronizing pulse is channeled through gate 80 and delivered to the control counter 76, enabling counter 76 to reset to its 98 rather than its 99 position when the first fast pulse is delivered through gate 72. During the next cycle between synchronizing pulses the control counter counts only 99 pulses.

If gate 82 is open when the synchronizing pulse is received, the synchronizing pulse enables the control counter 76 to be reset to position 100 by the next received pulse from gate 72. During the next cycle between synchronizing pulses the control counter counts 101 pulses to reach its zero position.

The clock counter 70 is connected to be reset to its zero position upon receipt of the synchronizing pulse. If the clock counter 70 has not counted 1,100 pulses, a signal is delivered to open gate 80. When the clock counter has counted 1,100 pulses, gate 80 closes and a signal is delivered through delay and hold circuit 90 to open gate 82 only if the synchronizing pulses does not arrive within the maximum storage time of the register 10. The delay and hold circuit 90 is reset by the synchronizing pulse. In its simplest form, the circuit 90 may be a flip-flop with a long time constant.

The flip-flop 62 is set by the synchronizing pulse from transmitter 12. It is reset by the clock counter 70 at the end of the sample, i.e. in the example stated, at the end of 1,000 pulses. At the end of the 1,000 sampling pulses, the clock counter 70 sets the flip-flops 64 and 78. The flip-flop 64 is reset and the flip-flop 66 is set by the vernier counter 74 when the vernier counter reaches its zero bit position. The flip-flop 66, through the OR gate 102, is reset by whichever comes first, the synchronizing pulse or an output signal from the AND gate 91.

The two input signals to the AND gate 91 are the "end of count" signal from the clock counter 70 and the zero position signal from the clock counter 76. The AND gate 91 has an output signal only when both of its input signals occur. Hence, the output signal of gate 91 is coincident with its input signal which occurs last. Thus, flip-flop 66 is reset by the synchronizing pulse, by the end of count of the register 10, or by the control counter zero position signal, depending on their order of occurrence. If the synchronizing pulse occurs first or second, it resets the flip-flop 66. If the synchronizing pulse occurs third, then either the end of count signal or the control counter zero position zignal, whichever occurs last, resets the flip-flop.

Flip-flop 78 is reset through the OR gate 101 by either the synchronizing pulse or by the control counter zero position signal, whichever occurs first.

When the synchronizing pulse is delivered to set the flip-flop 62 and open the gate 50, clock pulses from clock means 42 are delivered to the clock pulse rate divider 56 to deliver pulses at the sampling clock rate through the OR gate 68 to the clock counter 70 and, through AND gate 92 and pulse shaper 48, to the shift register 10, causing the shift register 10 to index at the sampling clock rate and to store signals from the receiver 18 in positions of the shift register indicative of the time lapse between the synchronizing pulse and the receipt of signals by the receiver 18. After a predetermined number of sampling clock pulses have been received (in the example chosen this is 1,000 clock pulses), the clock counter 70 delivers an end of sample signal to reset flip-flop 62 and to set flip-flops 64 and 78.

The setting of flip-flop 64 causes pulses from clock means 42 to be delivered to the clock pulse rate divider 58 which delivers fast clock pulses through OR gate 68 to the clock counter 70 and, through the AND gate 92 and pulse shaper 48, to the shift register 10. Fast clock pulses are also delivered by gate 68 through AND gate 72 to the vernier counter 74 and to the control counter 76. Gate 72 was opened at the end of the sample by the setting of flip-flop 78.

The waiting period for the next synchronizing pulse now begins, and the combination of this invention is adapted to cause a predetermined number of pulses (in the example, 100 pulses) to be delivered to the shift register to cause the shift register 10 to be in position with its leading bit ready to receive information from the receiver 18 at the time of receipt of the next synchronizing pulse.

For purposes of this example, it is assumed that the vernier counter 74 is initially set on its position zero at the time it starts to receive pulses from gate 72, i.e. at the end of the sample. With that assumption, it is expected that the shift register 10 will reach its position 1100 before the receipt of the next synchronizing pulse. The vernier counter 74 is typically a ring counter so that the position following position zero is position 00, and 100 pulses will cycle the vernier counter 74 back to its starting position. It will become apparent in the following description that during the adjustment period of repetitive intervals between synchronizing pulses, the initial position of the vernier counter 74 is immaterial. The control counter 76 is initially enabled to be set to its position 99 by the receipt of the first pulse from gate 72. The vernier counter 74 and the control counter 76 count down 100 pulses until their zero positions are reached. When the vernier counter 74 reaches its zero position, it resets flip-flop 66, starting the delivery of slow clock pulses from the clock rate divider 60 through the OR gate 68 to the counters 70, 74, and 76 and through the gate 92 and the pulse shaper 48 to the shift register 10. In the example stated, wherein the vernier counter 74 is initially set at its position zero, the delivery of a set pulse to the flip-flop 66 is ineffective because the control counter 76 simultaneously delivers a reset pulse to flip-flop 66. Thus, no additional pulses are delivered and the system rests until the receipt of the next synchronizing pulse. It may be that the time lag between the end of delivery of pulses to the shift register 10 and the receipt of the next synchronizing pulse from transmitter 12 is sufficiently long that all information delivered during the first interval by the receiver 18 to the shift register 10 is lost due to the nature of the storage cells of the dynamic shift register 10. This causes no difficulty, however, because the apparatus is merely adjusting its timing preparatory to actual use. It could take a maximum, in the stated example, of 100 intervals between synchronizing pulses to cause the circuit properly to adjust its timing.

When the clock counter 70 reaches its end of register position, it sets the delay and hold circuit 90. The circuit 90 is designed to have a slow time constant so that its output signal rises sufficiently high to open gate 82 only after an interval substantially equivalent to the slow clock repetition interval. If the synchronizing pulse arrives after the output of the flip-flop 90 has reached an amplitude sufficiently large to open the gate 82, the control counter 76 is enabled to reset, upon receipt of the next pulse from gate 72, not to bit position 99, but to position 100.

If the synchronizing pulse is delivered to gate 80 before the clock counter reaches the count 1,100, i.e. before the end of the register 10 is reached, the control counter 76 is enabled to be reset by the next pulse from gate 72, not to position 99, but to position 98.

If the synchronizing pulse is delivered to gate 85 at the time it should be, i.e. after the end of the register 10 is reached, but before the information in the register 10 is lost, the control counter 76 is enabled to be reset by the next pulse from gate 72 into bit position 99.

Returning now to the example wherein the vernier counter 74 initially started at its position zero, 100 pulses from the fast clock 58 are delivered to the shift register 10, and the shift register 10 reaches its 1100 position. The counters 74 and 76 are counted down to their zero positions. However, the synchronizing pulse has not yet been received, the delay and hold circuit 90 is energized and, when the synchronizing pulse finally arrives, it enables the control counter 76 to be reset to its position 100. 1,000 sampling clock pulses are again counted. The fast clock 58 then starts delivering fast clock pulses to the vernier counter 74, the control counter 76, and the clock counter 70. The count of fast pulses in counter 74 starts at bit position 99. In counter 76 it starts at bit position 100. When the vernier counter 74 reaches its zero position, it resets flip-flop 64 and sets flip-flop 66, starting the delivery of slow clock pulses. The clock counter 70, however, has now counted 1,100 pulses and closes the gate 92, thereby inhibiting the further delivery of pulses to the shift register 10. When the vernier counter 74 reaches its zero position, the control counter 76 is in its bit 1 position. One slow clock pulse is channeled through gate 72 to shift the control counter 76 into its zero position and to shift the vernier counter from its zero to its 99 position. When the control counter 76 reaches its zero position, it resets flip-flop 66 through gates 91 and 102 and resets flip-flop 78 through gate 101, allowing no more clock signals to be delivered until the next synchronizing pulse arrives. When the synchronizing pulse arrives, the control counter is again enabled to be reset by the next received fast pulse into its 100 position.

The sampling clock pulses are again counted. At the end of the sampling, the fast clock 58 starts delivering fast clock pulses which are counted by the counters 70, 74, and 76. The vernier counter counts 99 pulses to return it to its zero position. When the vernier counter reaches its zero position, the register 10 is in its position 1099 and the counter 76 is in its bit 2 position. One slow pulse is then delivered to the register 10 before the counter 70 closes gate 92. Two slow pulses are delivered to the counters 74 and 76 causing the vernier counter to index to its position 98 and causing the control counter to index to its zero position. When the control counter reaches its zero position, it resets flip-flops 66 and 78. When the next synchronizing pulse is delivered, the control counter 76 is enabled to be set by its next received pulse into its position 98, 99, or 100 depending upon which of the gates 80, 85 or 82 is open.

Figure 6:
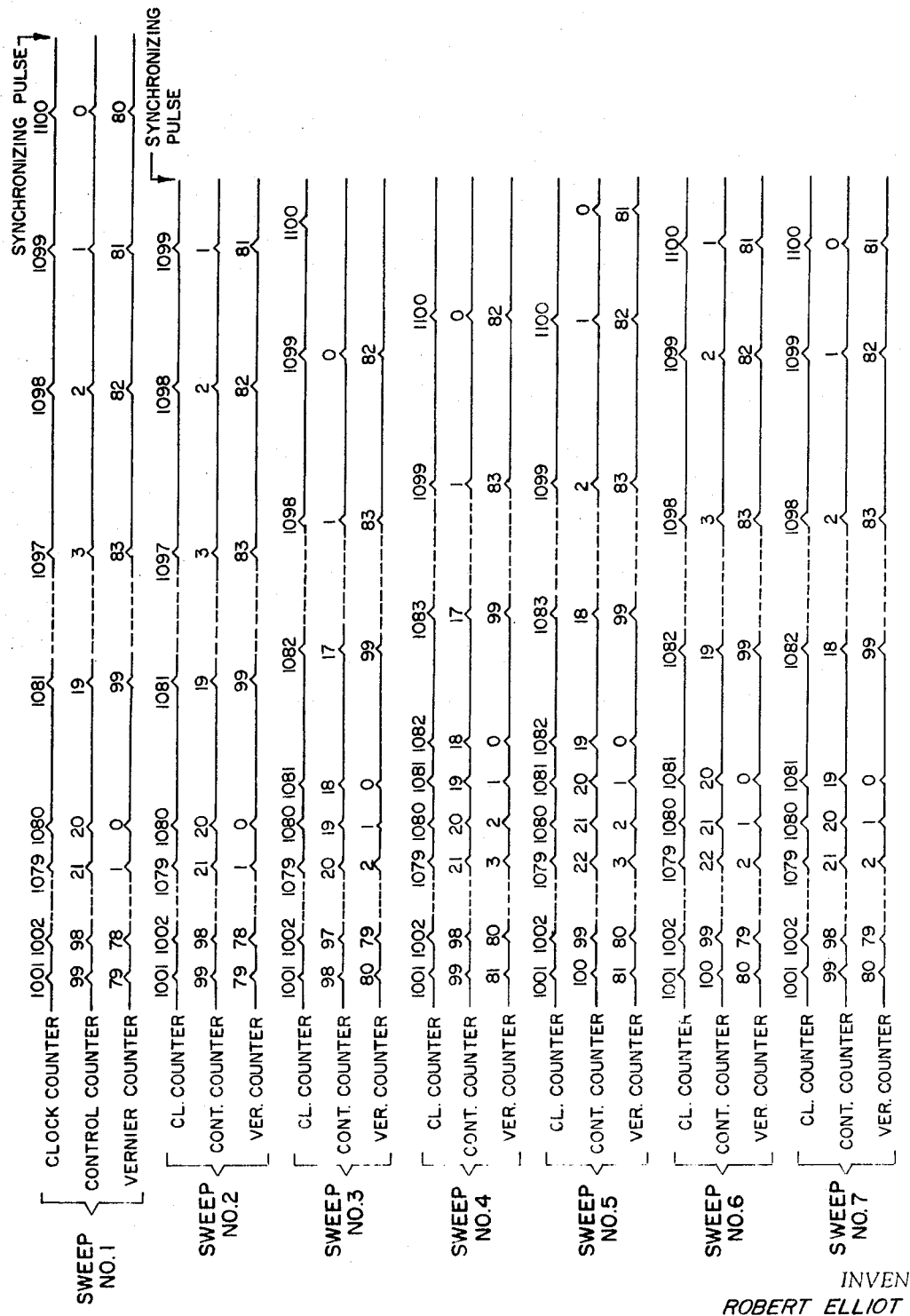
FIG. 6 is a series of timing diagrams demonstrating the self adjustment of the adaptive embodiment of FIG. 3.

The process of decreasing the number of fast pulses and increasing the number of slow pulses in the mix of pulses delivered to the register 10 continues until the synchronizing pulse arrives while gate 85 is open. For illustration purposes, assume that this occurs when the vernier counter cycles between its bit position 80 and its bit position 80, i.e. when the waiting period comprises 80 fast clock intervals and 20 slow clock intervals. The timing is shown in FIG. 6, Sweep No. 1. When the synchronizing pulse arrives, it is channeled through gate 85, enabling control counter 76 to be set by the next received pulse into its position 99. After the next sampling period, the clock counter 70 is in its position 1000. The first fast pulse indexes the clock counter 70 into its position 1001, indexes vernier counter 74 into its position 79, and sets control counter 76 into its position 99. The fast clock signals count the clock counter 70 up to its position 1080, control counter 76 down to its position 20, and vernier counter 74 down to its position zero. Slow clock signals are then channeled to counters 70, 74 and 76 until clock counter 70 reaches its position 1100, control counter 76 reaches its position zero, and vernier counter 74 reaches its position 80. The arrival of the next synchronizing pulse before gate 85 closes causes the sequence to be repeated. When the synchronizing signal is channeled through gate 85, it may be channeled to a computer as a signal that the information stored in the shift register 10 is synchronized and usable.

Suppose that the synchronizing pulse separation should then vary slightly so that the synchronizing pulse arrived at bit positions 1099 of the register 10, as shown in FIG. 6, Sweep No. 2. The synchronizing pulse is channeled through gate 80 enabling the control counter 76 to be reset upon receipt of the next pulse into its position 98.

After the next sampling period, when the first fast pulse is delivered, the clock counter counts to position 1001, the control counter 76 resets to its position 98, and the vernier counter counts down one pulse from its arrested position 81 into its position 80, as shown in FIG. 6, Sweep No. 3. The vernier counter 74 reaches its zero position after 81 fast clocks are delivered. When the vernier counter 74 reaches its zero position, the control counter is in its 18 and the clock counter 70 is in its position 1081. It takes 18 slow clocks to reach the zero position of the control counter. When the control counter 76 reaches its zero position, the vernier counter 74 is at its position 82 and the clock counter 70 is at its position 1099. But it takes 19 slow clock periods to cycle the register 10 into its position 1100 in synchronism with the synchronizing pulse. When the control counter 76 reached its zero position, flip-flop 78 was reset through gate 101 and, therefore, further clock signals are prevented from passing through gate 72 to counters 76 and 74. However, since the end of the count of counter 70 has not been reached, gate 91 is closed and flip-flip 66 is not reset, whereby an extra slow clock signal is allowed through gate 68 to the clock counter 70. This extra clock shifts the clock counter 70 and the register 10 to position 1100 (end of count) before the synchronizing pulse arrives. When the synchronizing pulse arrives, it is channeled through gate 85, indicating proper timing, and enabling the control counter 76 to be reset into its position 99 upon receipt of the next pulse.

After the next sampling period, when the clock counter 70 again reaches its position 1001, the control counter 76 is reset to its 99 position, and the vernier counter 74 is indexed to its position 81, as shown in FIG. 6, Sweep No. 4. Eight two fast pulses are delivered before the vernier counter 74 reaches its zero position. When the vernier counter 74 reaches its zero position, the clock counter 70 is at its position 1082, and the control counter 76 is at its position 18. Eighteen slow clock pulses are delivered before the control counter 76 reaches its zero position. When the control counter 76 reaches its zero position, the clock counter 70 is in its 1100 position, and the vernier counter 74 is in its position 82. The register 10 reaches its end sufficiently ahead of the arrival of the next synchronizing pulse that the delay and hold circuit 90 opens gate 82. When the synchronizing pulse arrives, it is channeled through gate 82 enabling control counter 76 to be reset by its next received pulse into its position 100.

After the end of the next sampling period, when the clock counter receives the first fast pulse shifting it into its position 1001, the control counter 76 is reset to its position 100, and the vernier counter is indexed to its position 81, as shown in FIG. 6, Sweep No. 5. Again 82 fast clock pulses are delivered before the vernier counter reaches its zero position. When the vernier counter 74 reaches its zero position, the clock counter 70 is in its position 1082, and the control counter is in its position 19. Eighteen slow clock signals are delivered, indexing the clock counter 70 and register 10 into their position 1100, at which time gate 92 closes inhibiting further delivery to register 10. When the clock counter 70 reaches its position 1100, the control counter 76 is in its position one, and the vernier counter 74 is in its position 82. One more slow pulse is delivered to the control counter 76 and the vernier counter 74, counting the control counter 76 down to its position zero, and counting the vernier counter 74 down to its position 81. Because the end of counter 70 and register 10 is reached too soon, the stored information is lost, and the next synchronizing pulse is channeled through gate 82 enabling the control counter 76 to be reset to its position 100 upon receipt of the next pulse.

At the end of the next sampling period, when the first fast pulse is delivered, the clock counter 70 indexes into its position 1001, the control counter 76 is reset to its position 100, and the vernier counter 74 is indexed to its position 80, as shown in FIG. 6, Sweep No. 6. Eighty one fast clock pulses are delivered to index clock counter 70 to its position 1081, to index control counter 76 to its position 20, and to index vernier counter 74 to its position zero. Nineteen slow cock pulses later, the clock counter 70 and register 10 reach their position 1100, control counter 76 reaches its position one, and vernier counter 74 reaches its position 81. The synchronizing pulse arrives a short time thereafter, resetting flip-flops 66 and 78, and enabling control counter 76 to reset to its position 99 upon receipt of the next pulse.

At the end of the next sampling period, when the first fast pulse is received, the control counter 76 is reset to its position 99, the clock counter is set to position 1001, and the vernier counter 74 indexes to its position 80. A count of 81 fast clock pulses are delivered to index the vernier counter 74 to its zero position, starting the slow clock pulses. When the counter 74 reaches its zero position, the clock counter 70 has indexed to its position 1081, and the control counter 76 has indexed to its position 19. Nineteen slow clock pulses are then delivered to index the clock counter 70 to its position 1100, to index control counter 76 to its zero position, and to index vernier counter 74 to its position 81. The synchronizing pulse arrives soon after the last slow pulse, the system is re-synchronized, and the sequence of FIG. 6, Sweep No. 7 repeats itself.

Thus, the apparatus is used in a system, such as a radar or sonar system, characterized by transmission of a pulse of energy in synchronism with a synchronizing pulse, and measurement of information, such as the range of a target, by its timing relative to the synchronizing pulse. The returned information is stored in a dynamic register whose storage time is short compared to the time between synchronizing pulses, so that information generated by consecutive pulses can be compared. The information in the dynamic register is revitalized, pending the receipt of the next synchronizing pulse, and it is placed at a position in the register so that the stored information can easily be compared with the incoming information. Typically the information is indexed serially through the memory, and after the sampling period this indexing is accomplished by a mixture of fast and slow pulses such that the leading bit of the information appears at a predetermined position, such as the end of the register, substantially in synchronism with the next synchronizing pulse.

It is apparent that the groups of slow and fast pulses may be introduced in either order, depending upon the supporting circuits.

Although the invention has been described in detail above, the invention is not be limited thereby, but only in accordance with the spirit and scope of the appended claims.

We claim:

1. In combination:

Apparatus adapted to generate a series of synchronizing pulses;

Dynamic shift register means having a predetermined number of volatile storage cells, each capable of storing information only a predetermined short period of storage;

Means for clocking said register means at a predetermined sampling rate for at least a first portion of the period between said synchronizing pulses; and Second means for clocking said register means, subsequent to said first portion of the period between said synchronizing pulses, with a mixture of fast and slow clocking pulses, said mixture being proportioned to cause said register to reach its end prior to, but within said period of storage of, said synchronizing pulses.

2. The combination recited in claim 1 in which said apparatus is a radar apparatus, and in which radar information is stored in said register during said first portion of the period between synchronizing pulses and is transferred through said register at said fast and slow rates so that the leading bit of information stored in said register reaches the end of said register prior to receipt of, but within said period of storage of, said synchronizing pulses.

3. The combination recited in claim 1 in which said apparatus is a sonar apparatus, and in which sonar information is stored in said register during said first portion of the period between synchronizing pulses and is transferred through said register at said fast and slow rates so that the leading bit of information stored in said register reaches the end of said register prior to receipt of, but within said period of storage of, said synchronizing pulses.

4. The combination recited in claim 1 in which said volatile storage cells comprise field-effect-transistors adapted to store information and signals for said short period of storage.

5. The combination of claim 4 in which said field-effect-transistors are metal-oxide-silicon types.

6. The combination recited in claim 1 and further comprising means for indicating the end of said first portion of the period between said synchronizing pulses.

7. The combination of claim 6 in which the period of time between the end of said first portion and the end of the period between said synchronizing pulses is characterized by said second clocking means clocking said register with separate groups of slow and fast pulses in either order.

8. The combination of claim 7 and further comprising means for controlling the time of change in pulse rate between said fast and slow pulses.

9. The combination of claim 8 in which said group of slow pulses precedes said group of fast pulses, and in which said apparatus generates a pre-trigger pulse which is connected to control the time of change of the pulse rate delivered to said register from slow to fast pulses.

10. The combination of claim 9 in which:

said first portion of the period between said synchronizing pulses comprises a sample time, $Xt_L$;

a second portion of said period comprises a slow clock time, $Yt_S+P$;

a third portion of said period comprises a fast clock time, $Zt_F$;

a last portion of said period comprises a waiting period, $W$; and wherein $X$ is the number of sampling pulses delivered to said register, $t_L$ is the time between said sampling pulses, $Y$ is the number of slow pulses delivered to said register, $t_S$ is the time between said slow pulses, $P$ is the time between the last said slow pulse and said pre-trigger pulse, $Z$ is the number of fast pulses delivered to said register, $t_F$ is the time between said fast pulses, $W$ is the time between the last said fast pulse and the said synchronizing pulse, $X+Y+$ is the number of cells in said register, and $W$ is less than said period of storage of said cells.

11. The combination of claim 10 and further comprising:

A counter, connected to count the number of pulses delivered to said register, and connected to be zero-set by said synchronizing pulse;

First gating means, adapted to be opened by said synchronizing pulse and to be closed by said counter after said counter counts $X$ pulses, for gating pulses to said register at said sampling rate;

Second gating means, adapted to be opened by said counter at the time said first gating means is closed and to be closed by said pre-trigger pulse, for gating pulses to said register at said slow rate; and Third gating means, adapted to be opened by said pre-trigger pulse and to be closed by said counter when the count in said counter equals the number of said cells, $X+Y+$, in said register, for gating pulses to said register at said fast rate.

12. The combination of claim 8 and further comprising:

Means for sensing the reaching of the end of said register;

Means for generating a first control signal when the said synchronizing pulse arrives before the end of said register is reached;

Means for generating a second control signal when the end of said register is reached before, but within said period of storage of, said synchronizing pulse;

Means for generating a third control signal when the end of said register is reached before, but not within said period of storage of, said synchronizing pulse;

Means connected to be responsive to said first control signal to increase the number of said slow pulses while decreasing the number of said fast pulses between said synchronizing pulses;

Means connected to be responsive to said second control signal to maintain the mix of said fast and slow pulses between said synchronizing pulses; and Means connected to be responsive to said third control signal to increase the number of said fast pulses while decreasing the number of said slow pulses between said synchronizing pulses.

13. The combination of claim 12 in which said group of fast pulses precedes said group of slow pulses.

14. The combination of claim 13 in which, when said second control signal is controlling:

Said first portion of the period between said synchronizing pulses comprises a sample time, $Xt_L$;

A second portion of said period comprises a fast clock time, $Zt_F$;

A third portion of said period comprises a slow clock time, $Yt_S$;

A last portion of said period comprises a waiting period, $W$; and

Wherein $X$ is the number of sampling pulses delivered to said register, $t_L$ is the time between sampling pulses, $Z$ is the number of fast pulses delivered to said register, $t_F$ is the time between said fast pulses, $Y$ is the number of slow pulses delivered to said register, $t_S$ is the time between said slow pulses, $W$ is the time between the last said slow pulse and the said synchronizing pulse, $X+Z+Y$ is the number of cells in said register, and $W$ is less than said period of storage of said cells.

15. The combination of claim 14 and further comprising:

A clock counter, connected to count the number of sampling, fast, and slow pulses delivered, connected to be reset by said synchronizing pulses, and adapted to generate signals indicative of the end of the sampling pulses after $X$ pulses have been delivered, the end of the register after $X+Z+Y$ pulses have been delivered, and not to the end of the register before $X+Z+Y$ pulses have been delivered;

A control counter, gated to receive all fast and slow pulses delivered, enabled to be set to count $Z+Y-1$ pulses by said first control signal, enabled to be set to count $Z+Y$ pulses by said second control signal, and enabled to be set to count $Z+Y+$ pulses by said third control signal, said control counter generating an output signal when it reaches the end of its count.

A vernier ring counter, gated to receive said fast and slow clocks, and adapted to generate an output signal when a predetermined bit position of said ring counter is energized;

Means for gating pulses at said sampling rate to said clock counter and said register, opened in response to said synchronizing pulse and closed by a signal from said clock counter at the end of $X$ pulses;

Means for gating pulses at said fast rate to said clock counter and said register, opened by a signal from said clock counter at the end of $X$ pulses and closed by an output signal from said ring counter.

Means for gating pulses at said slow rate to said clock counter and said register, opened by an output signal from said ring counter and closed by said next synchronizing pulse if it occurs before the $X+Z+Y$ count, and closed by an output signal from said control counter if it occurs after the $X+Z+Y$ count and before the next synchronizing signal; and Means for inhibiting the transmission of pulses, in excess of $X+Z+$ pulses, to said register.

16. A method for adjusting the mixture of a total fixed number of pulses having two different, faster and slower, pulse rates, within a predetermined limit into an interval between two pulses whose separation is substantially constant at a value greater than said total fixed number of pulses times the period of said faster pulse rate, and less than said total fixed number of pulses times the period of said slower pulse rate comprising:

a. Arbitrarily choosing a mixture of said faster and slower pulses;
b. Counting the number of said pulses;
c. Sensing the end of said interval;
d. When the end of said interval arrives before said total number of pulses arrives, increasing the number of said faster pulses and decreasing the number of said slower pulses while keeping said total number of faster and slower pulses constant;
e. When said total number of pulses arrives, outside of said limit, before the end of said interval arrives, increasing the number of said slower pulses and decreasing the number of said faster pulses while keeping the total number of said faster and slower pulses constant; and
f. Repeating steps (b) through (e) until said total number of pulses arrives, inside of said limit, before the end of said interval arrives.

17. In a system characterized by transmission of a pulse of energy in synchronism with a synchronizing pulse, and measurement of information by its timing relative to said synchronizing pulse, the returned information being stored in a dynamic register whose storage time is short compared to the time between synchronizing pulses, so that information generated by consecutive pulses can be compared, the improvement comprising:

Means for revitalizing said information pending the receipt of the next synchronizing pulse; and Means for placing said revitalized information into positions in said register which are the same during successive intervals between synchronizing pulses so that the information can be compared with incoming information.

18. Apparatus as recited in claim 17 in which said revitalized information is placed by indexing said information serially through said dynamic memory, including means for timing said indexing in series of fast and slow pulses, with the mix of said fast and slow pulses such that the leading bit of said information appears at the end of said register substantially in synchronism with said synchronizing pulse.

* * * * *

UNITED STATES PATENT OFFICE
CERTIFICATE OF CORRECTION

Patent No. 3,660,841       Dated May 2, 1972

Inventor(s) ALLEN E. POWERS et al

It is certified that error appears in the above-identified patent and that said Letters Patent are hereby corrected as shown below:

Column 4, line 56, for "countered" read--counted--;

Column 7, line 10, for "clock" read--control--;

Column 8, line 31, after "to" read--bit--;

Column 9, line 72, for "Eight" read--Eighty--;

Column 12, line 9, for "X+Y+" read--X+Y+Z--;

Column 12, line 26, for "X+Y+" read--X+Y+Z--;

Column 13, line 11, for "Z+Y+" read --Z+Y+1--;

Column 13, line 35, for "X+Z+" read --X+Z+Y--.

Signed and sealed this 21st day of November 1972.

(SEAL)
Attest:

EDWARD M. FLETCHER, JR.
Attesting Officer

ROBERT GOTTSCHALK
Commissioner of Patents